(12) United States Patent
Brahem et al.

(10) Patent No.: US 11,168,264 B2
(45) Date of Patent: Nov. 9, 2021

(54) THREE DIMENSIONAL STRUCTURED PACKING FOR IMPROVING THE CONTACT BETWEEN A GAS PHASE AND A DISPERSED SOLID PHASE FOLLOWING IN COUNTER-CURRENT

(71) Applicant: IFP Energies nouvelles, Rueil-Malmaison (FR)

(72) Inventors: Rim Brahem, Lyons (FR); Benjamin Amblard, Lyons (FR); Ann Cloupet, Longes (FR); Thierry Gauthier, Brignais (FR); Ludovic Raynal, Oullins (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 34 days.

(21) Appl. No.: 16/469,041

(22) PCT Filed: Dec. 5, 2017

(86) PCT No.: PCT/EP2017/081427
§ 371 (c)(1),
(2) Date: Jun. 12, 2019

(87) PCT Pub. No.: WO2018/108613
PCT Pub. Date: Jun. 21, 2018

(65) Prior Publication Data
US 2020/0095507 A1    Mar. 26, 2020

(30) Foreign Application Priority Data
Dec. 14, 2016 (FR) ...................................... 1662458

(51) Int. Cl.
*B01J 19/32* (2006.01)
*B01J 8/34* (2006.01)
(Continued)

(52) U.S. Cl.
CPC ................ *C10G 11/18* (2013.01); *B01J 8/34* (2013.01); *B01J 19/32* (2013.01);
(Continued)

(58) Field of Classification Search
None
See application file for complete search history.

(56) References Cited

U.S. PATENT DOCUMENTS 4,830,792 A * 5/1989 Wilhelm .................. B01J 19/32
261/79.2
5,158,712 A * 10/1992 Wilhelm ............... B01F 5/0617
261/79.2
(Continued)

FOREIGN PATENT DOCUMENTS

FR       2806325 A1    9/2001

OTHER PUBLICATIONS

"Secant Plane". Retrieved from Wikipedia website on Feb. 4, 2021 (Year: 2021).*
(Continued)

*Primary Examiner* — Jennifer A Leung
(74) *Attorney, Agent, or Firm* — Millen White Zelano & Branigan, PC; Brion P. Heaney

(57) ABSTRACT

The present invention describes a packing with a three-dimensional structure which is particularly suited to creating homogenous and anisotropic mixing between the gas phase and a dispersed solid phase moving in counter-current flow. Application of this packing to the stripper of fluidized catalytic cracking units.

20 Claims, 7 Drawing Sheets

(51) Int. Cl.
*C10G 11/18* (2006.01)
*B33Y 10/00* (2015.01)

(52) U.S. Cl.
CPC ........... *B01J 2219/32234* (2013.01); *B01J 2219/32241* (2013.01); *B01J 2219/32268* (2013.01); *B01J 2219/32272* (2013.01); *B01J 2219/3306* (2013.01); *B01J 2219/3325* (2013.01); *B33Y 10/00* (2014.12)

(56) References Cited

U.S. PATENT DOCUMENTS

| | | | | |
|---|---|---|---|---|
| 5,500,160 A | * | 3/1996 | Suess | F28F 25/08 261/79.2 |
| 5,996,974 A | * | 12/1999 | Lehman | B01D 59/04 261/79.2 |
| 2003/0047820 A1 | | 3/2003 | Lehman et al. | |
| 2020/0109334 A1 | * | 4/2020 | Brahem | C10G 11/18 |

OTHER PUBLICATIONS

International Search Report PCT/EP2017/081427 dated Feb. 1, 2018 (pp. 1-3).

N.N.: "Mixing and Reaction Technology Pace Setting Technology", May 10, 2016 (May 10, 2016), XP055399522, Retrieved from the Internet <URL:http://www.sulzer.com/en/-/media/Documents/ProductsAndServices/Mixpac_Cartridges_Applications_Static_Mixers/Static_Mixers/Brochures/Mixing_and_Reaction_Technology_e_23270640.pdf> [retrieved on Aug. 17, 2017] (pp. 1-24).

Raschig Jaeger: "Metal Structured Packing—MaxPak Product Bulletin 525 Table of Contents", Jul. 6, 2010 (Jul. 6, 2010), XP055399523, Retrieved from the Internet <URL:http://www.raschig.de/editor/assets/RaschigRings/Literature-Structured packings/Info RASCHIG-JAEGER MaxPak Structured Packing-525 pdf> [retrieved on Aug. 17, 2017] (pp. 1-18).

* cited by examiner

THREE DIMENSIONAL STRUCTURED PACKING FOR IMPROVING THE CONTACT BETWEEN A GAS PHASE AND A DISPERSED SOLID PHASE FOLLOWING IN COUNTER-CURRENT

CONTEXT OF THE INVENTION

The invention consists in a novel type of packing intended to be fitted to the strippers in fluid catalytic cracking (abbreviated to FCC) units.

FIG. 1 depicts a schematic view of an FCC unit using the so-called R2R technology, namely having one riser (1) and two regenerators (5) and (6) in series. A description of this technology is provided, for example, in document U.S. Pat. No. 5,716,585.

This technology is particularly well-suited to the cracking of heavy fractions of the vacuum distillate or atmospheric residue type, generally following hydrotreatment.

The "riser" refers to the fluidized upflow tubular reactor in which the cracking reactions take place. Because the vocabulary used in the context of FCC is well known and derived from English-language terms, it is those terms that will be used in the remainder of the text.

The regenerated catalyst coming from the second regenerator (6) is introduced into the base of the riser (1), rises up along the riser (1) giving rise to the cracking reactions and to certain parasitic reactions that lead to the production of coke that becomes deposited on the surface of said catalyst. The coked catalyst is separated from the gaseous cracking effluent in a separation device situated in the upper part (2) of the riser (1), which is a device generally supplemented by one or two cyclone stages, and is then introduced into a stripping zone (4) the purpose of which is to release as much as possible of the hydrocarbons adsorbed onto the surface of the catalyst, so as to leave a coked catalyst with the minimum possible amount of adsorbed hydrocarbons.

The catalyst after stripping is then sent on to the regeneration section which has two stages (5) and (6).

Stripping is performed using a stripping fluid (9), generally steam. Inside the stripper (4), the flow is therefore generally counter-current between a downflow emulsion phase (catalyst+gas) and the upflow fluidizing gas.

A packing, or any other equivalent technology, such as the technologies given by way of example in FIG. 2, (these being, in order from right to left: deflectors, "disk—doughnut" plates, packing), arranged inside the stripper (4) has the objective of encouraging contact between the catalyst and the stripping fluid and of ensuring good homogeneity.

One example of a catalytic cracking method particularly well-suited to the cracking of heavy fractions, such as vacuum distillates or atmospheric residues, generally after hydrotreatment, is that using R2R technology.

More generally, the invention may apply to any fluidized catalytic conversion technologies in which a stripping unit is needed: FCC with a single regenerator (lighter feedstocks) or with orientations with different selectivities, naphtha catalytic cracking NCC, deep catalytic cracking DCC, methanol-to-olefin (MTO) or methanol-to-gasoline (MTG) conversion, etc.

Replicating a certain number of layers along a vertical axis makes it possible to form the complete structure of the packing according to the invention. In each layer, the basic element is replicated with a triangular pitch spacing which is not the same on the different layers.

In one alternative form of the invention all of the patterns may be offset when considering one layer with respect to the next. If the 3 most closely-spaced patterns of a given layer (N) are grouped together, they form a triangle. This triangle is offset on the next layer (N+1) so that one of the vertices of the triangle of the layer (N+1) lies at the center of the circle inscribed inside the triangle of the layer (N).

The offset may continue on to the subsequent layers.

The orientation of the elements in the second layer is preferably offset by 180° in rotation with respect to those of the first layer. In this case, the orientation of the first layer is seen again on the third successive layer.

The variation in orientation from one layer to the next may also be random while still falling within the scope of the invention.

It would still be within the scope of the invention if the orientation of the elementary patterns were not modified from one layer to the next.

Figure 1:
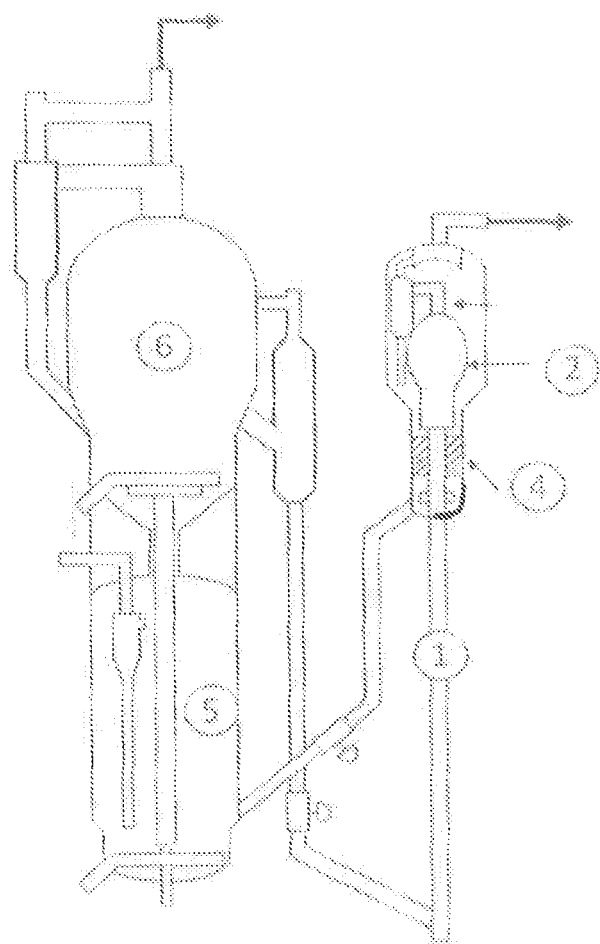
FIG. 1 is a schematic depiction of a catalytic cracking unit using the R2R technology, which allows the stripper to be correctly positioned at the upper end of the riser and showing the typical positioning of the packing inside the stripper.
Figure 2:
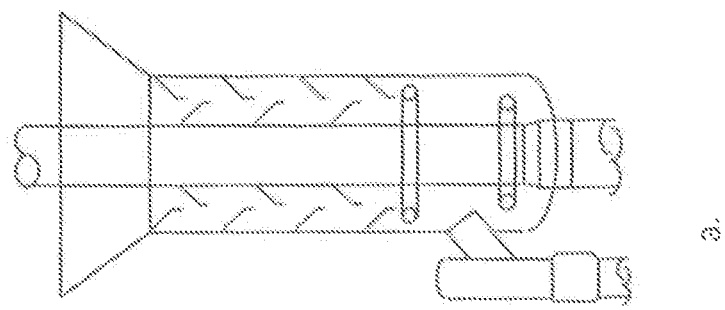
FIG. 2 provides a number of examples of packings according to the prior art, such as are often encountered in the strippers of catalytic cracking units.
Figure 2:
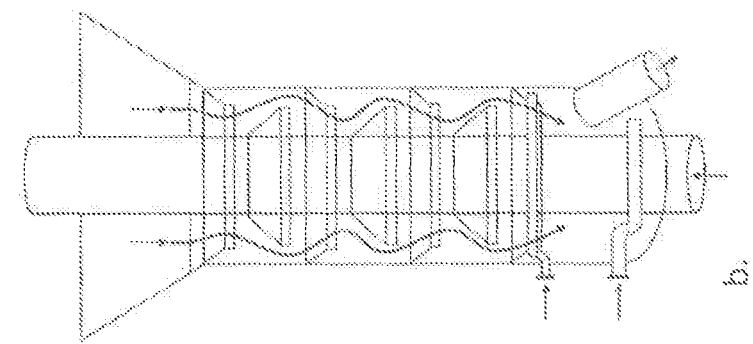
Figure 2:
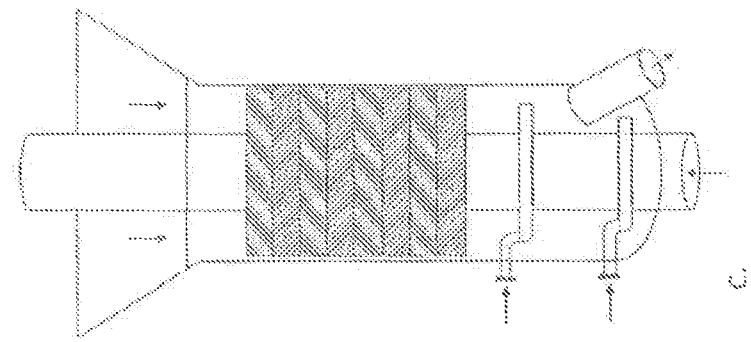
Figure 3:
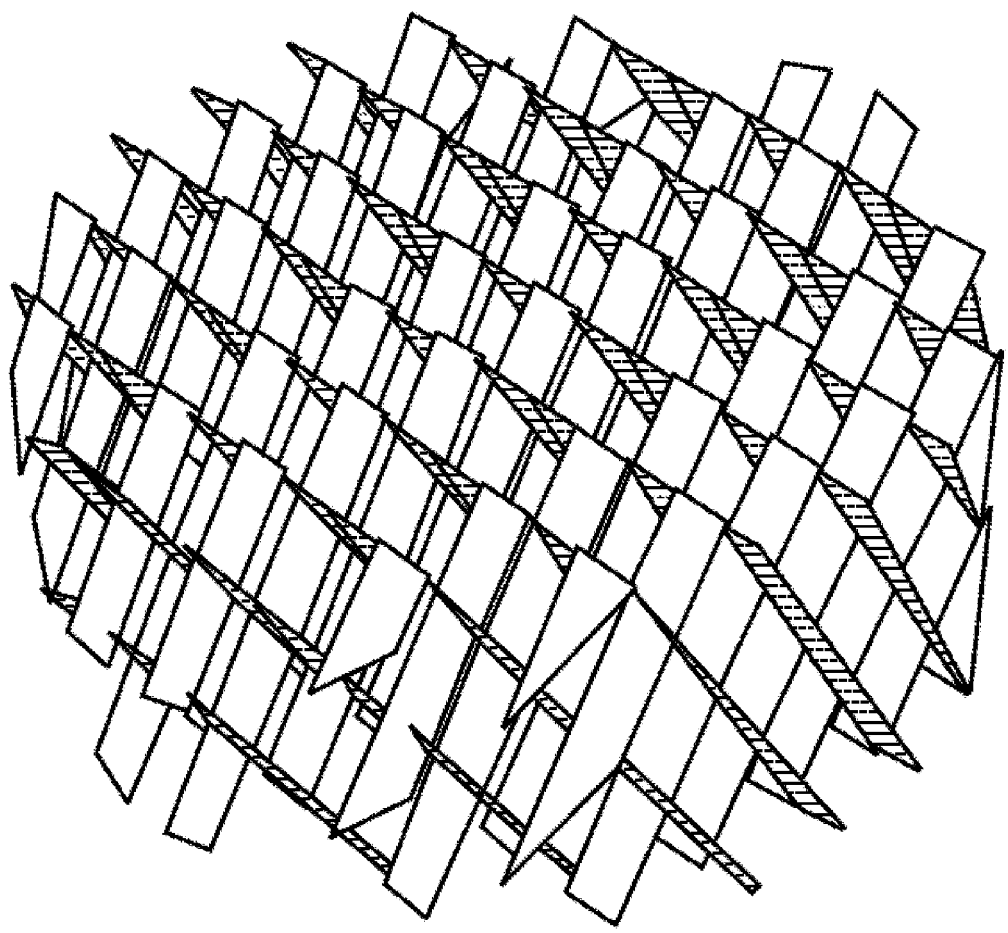
FIG. 3 is a 3-D depiction of the packing structure of the closest prior art corresponding to document U.S. Pat. No. 6,224,833, providing a visual example of the two systems of strips arranged in a triangle.
Figure 4B:
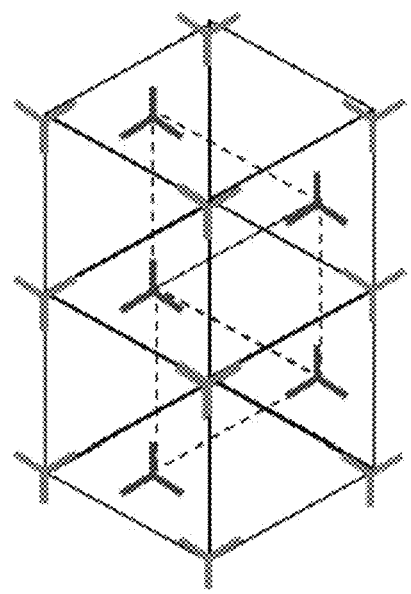
FIG. 4b is a projection in a plane of the elementary patterns such as they are arranged in the plane in question with a triangular pitch spacing. This plane corresponds to a layer, which is the term that will be used in the remainder of the text.
Figure 4A:
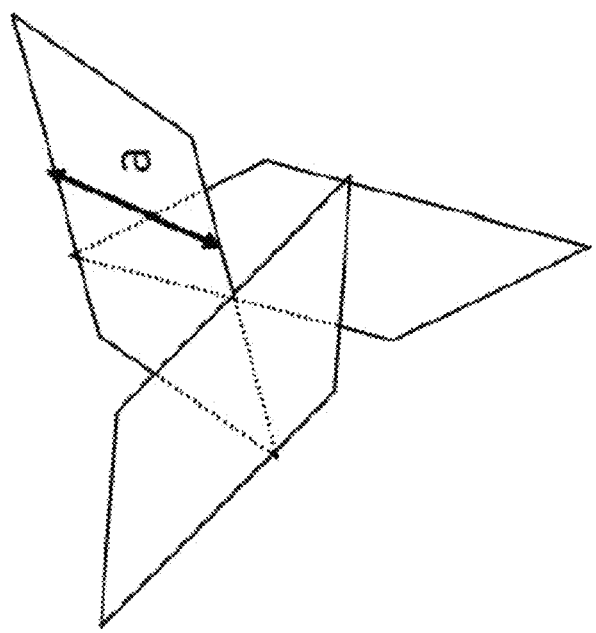
FIG. 4a is a 3-D depiction of the elementary pattern of the packing structure according to the invention. This figure clearly shows the 3 fins each belonging to a different plane from the other two, the resulting elementary pattern being, in projection, likenable to a 3-branch star.
Figure 4C:
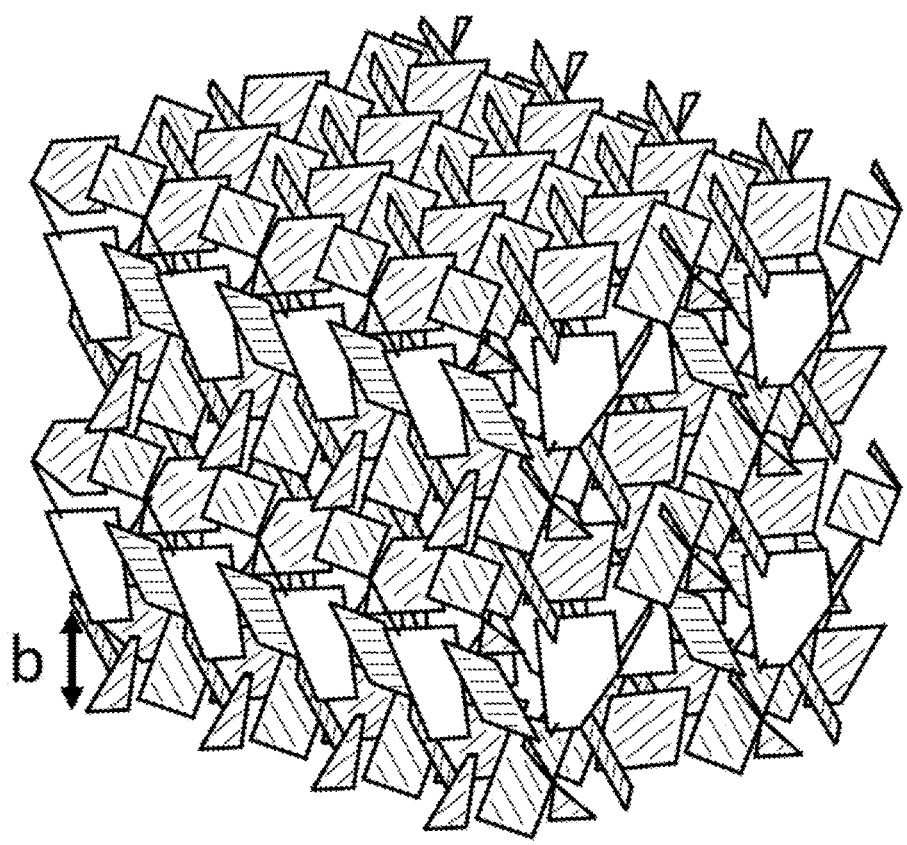

FIG. 4c is a 3-D depiction of the entire structure according to the invention, showing the distance b that separates two successive layers.

Figure 5:
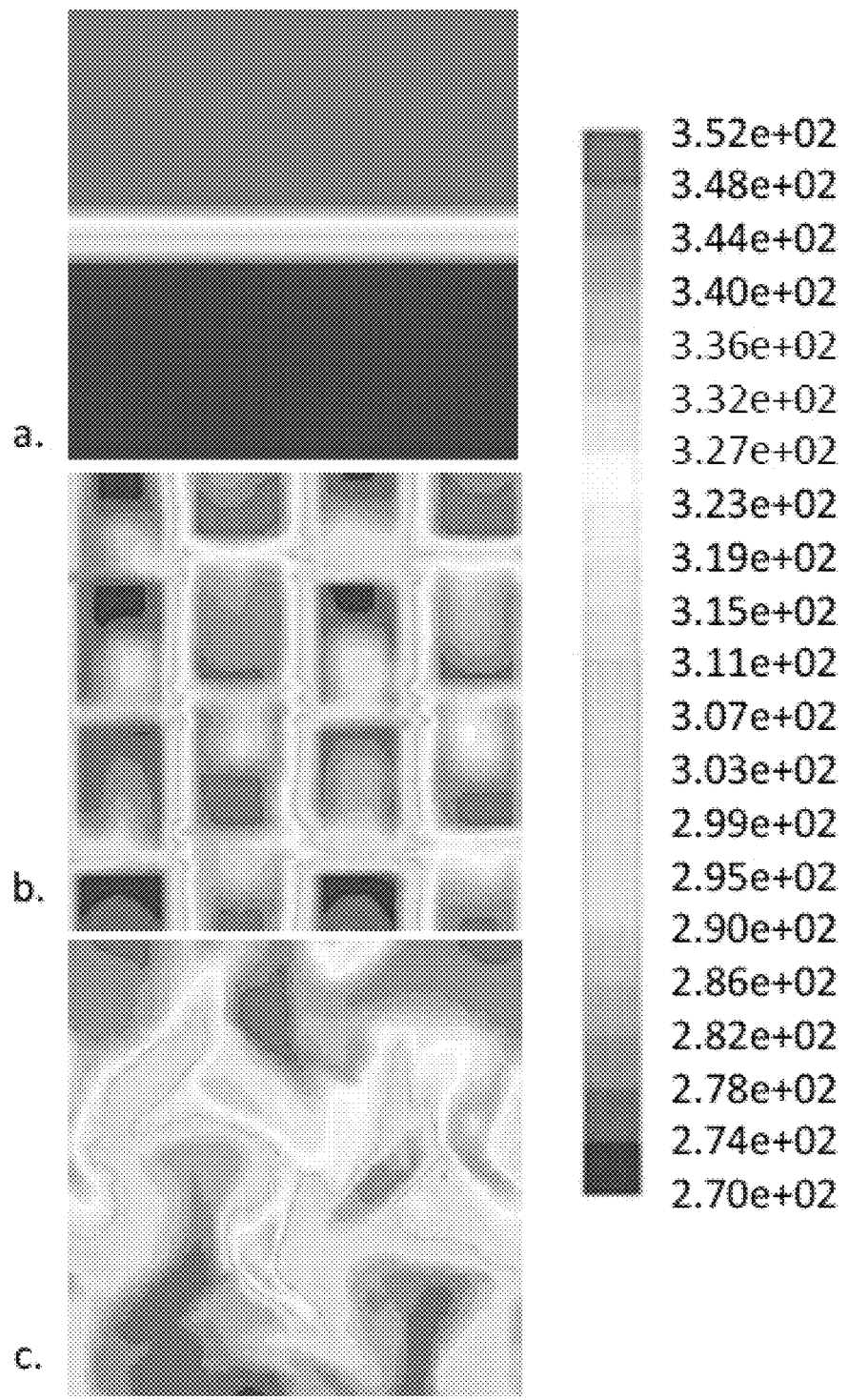

FIG. 5 is a comparison between the results of CFD (Computational Fluid Dynamics) simulation on the packing of the prior art (FIG. 5b) and on the packing of the invention (FIG. 5c) in an instance where the initial poor distribution is oriented along a substantially horizontal axis (FIG. 5a).

Figure 6:
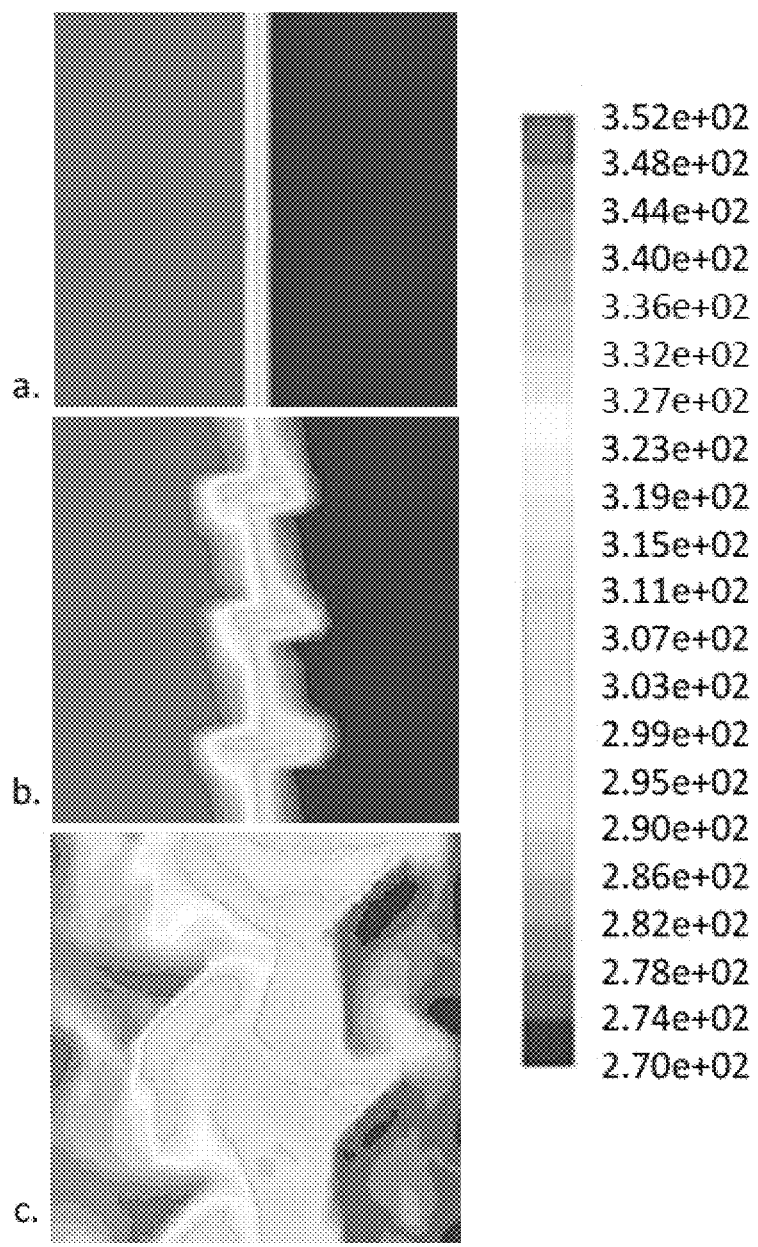

FIG. 6 is a comparison between the results of CFD (Computational Fluid Dynamics) simulation on the packing of the prior art (FIG. 6b) and on the packing of the invention (FIG. 6c) in an instance where the initial poor distribution is oriented along a substantially vertical axis (FIG. 6a).

The simulation involves examining the ability of the two packings to dissipate an initially poor temperature distribution.

The analogy between temperature and concentration in each of the gas and dispersed-solid phases is something that has been well validated by those skilled in the art of this kind of simulation.

EXAMINATION OF THE PRIOR ART

A fairly complete description of catalytic cracking using the R2R technology can be found in document U.S. Pat. No. 5,716,585.

The closest prior art to the invention may be considered to be made up of document U.S. Pat. No. 6,224,833, which describes a "packing" made up of two series of parallel strips belonging to two different planes having an intersection.

All the strips in one given plane are mutually parallel, and two most closely-spaced strips of the one same plane are separated by a space more or less the same size as a strip.

The strips belonging to the second plane are situated precisely in the gaps left free by the strips of the first plane.

This results in a structure which forces the upflow gas to progress along a tortuous path and forces the catalyst in theory to slide along the various strips.

Overall, the gas is routed along two series of parallel paths with meeting points, more specifically points of tangency, which are supposed to create disturbances, although this is not truly organized.

Document WO2015/095 540 describes a packing structure using three strips situated in different planes. This results in a packing structure which approximates to the one described in document U.S. Pat. No. 6,224,833 in which the strips of the one same plane may exhibit different orientations along the median axis belonging to said plane. Nevertheless, in the cited document, each strip remains planar.

The present invention consists of a packing the structure of which is truly three-dimensional in comparison with those of the prior art which remain two-dimensional. This structure is based on the reproduction of a three-dimensional elementary pattern distributed in several parallel planes.

Better contact between the coked catalyst and the stripping gas makes it possible, for the same overall performance characteristics, to reduce the flow rate of the stripping gas or the size of the stripper.

In the case of operation with the same stripper dimensions and the same gas flow rate, a more homogeneous mixture makes it possible to improve the stripping and therefore reduce the $\Delta$coke between the riser and the regenerator. The $\Delta$coke is the percentage by weight of coke and of hydrocarbons adsorbed on the catalyst. Conventionally, it is between 0.6 and 1% for a unit having a single regenerator, and between 1 and 1.5% for a unit having two regenerators.

Better stripping allows a between 5 and 10% improvement in the reduction of $\Delta$coke in the stripper. The consequence of such a reduction is a 5 to 10% increase in the solids recirculation flow rate (for the same temperature within the riser). In such instances, the yields of products that can be put to profitable use are increased.

Another advantage in improving the mixing between the emulsion and gas is that of increasing the capacity of the stripper (higher internal flooding limit). In instances in which this capacity is the limiting factor of the unit, that also constitutes an increase in the overall capacity of the method.

BRIEF DESCRIPTION OF THE INVENTION

The present invention may be defined as being a packing that makes it possible to achieve homogeneous and anisotropic contact (which means to say contact without a favored direction in space), between a gas phase and a dispersed solid phase flowing in counter-current, said packing being characterized by a three-dimensional structure. This three-dimensional structure consists of an elementary pattern produced by means of 3 secant planes and determining a three-vane volume, each vane being situated in one of the secant planes.

The various elementary patterns are distributed in a plane that is distinct from the 3 secant planes with a triangular pitch spacing, and the final structure corresponding to a stack of several parallel planes, each of these planes having the same density of elementary patterns.

The plane in which the elementary patterns are distributed is referred to as a layer.

The elementary patterns can be inscribed within a triangular mesh, the pitch being 1 to 1.5 times the minimum distance d defined by:

$$d=(a+a*\cos(60°)+b/2\ \sin(90°-\alpha))$$

in which expression the angle $\alpha$ is the angle that the vanes of the elementary pattern make with the horizontal, and which is comprised between 45° and 75°, and preferably between 55° and 65°.

a is the width of the vanes and comprised between 3 cm and 30 cm, and preferably between 5 cm and 15 cm.

b is the distance separating two successive layers and comprised between 3 cm and 50 cm, and preferably between 6 cm and 20 cm.

The triangular pitch spacing at which the various elementary patterns in a given layer are distributed is comprised between 1 and 1.5 times the minimum distance d, and preferably between 1.1 and 1.3 d.

The positioning of the elementary patterns may be offset when considering one layer with respect to the next layer. If the 3 most closely-spaced patterns of a given layer (N) are grouped together, they form a triangle. This triangle is offset on the next layer (N+1) so that one of the vertices of the triangle of the layer (N+1) lies at the center of the circle inscribed inside the triangle of the layer (N).

The offset may continue on to the subsequent layers.

For an illustration of this offset between two successive layers reference may be made to FIG. 4b which shows the positioning of the elementary patterns on two successive layers in superposition.

Having no offset between two successive layers, or even having an offset that is random in so far as there may be an offset between certain successive layers and not between other successive layers, still remains within the scope of the invention.

The packing according to the present invention may apply to any process requiring countercurrent flow between an upflow gas phase and a downflow emulsion phase (solid+gas).

In particular, the packing according to the invention is particularly well-suited to stripping the catalyst in catalytic cracking units, said packing being placed inside the stripper, and said stripper operating as a fluidized bed with a fluidization rate of between 10 cm/s and 40 cm/s. The solid stream in the stripper is typically between 25 and 200 kg/m$^2$.s, and preferably between 50 and 150 kg/m$^2$.s.

As far as the production of the three-dimensional packing according to the invention is concerned, it is possible to employ so-called additive manufacturing techniques, for example selective laser melting, selective laser sintering, or else Fused Deposition Modeling.

DETAILED DESCRIPTION OF THE INVENTION

The present invention may be defined as being a packing of three-dimensional structure suited to bringing into contact with one another an upflow gas phase and a downflow solid-gas emulsion phase. The structure of the packing according to the present invention consists of an element of three-dimensional geometry which is repeated in various parallel planes.

The basic three-dimensional pattern is a complex volume delimited by 3 vanes, each vane belonging to a plane, and the 3 planes thus defined being such that, considered in pairs, they always have an intersection. That prevents two planes from being able to be parallel.

A vane is the name given to a finite rectangular surface, namely one that has a well-defined length and width, and which is cut in a plane.

More specifically, each of the vanes lies in a plane which makes an angle of 120° with the other two planes corresponding to the other two vanes, as depicted in FIG. 4a.

The width a of the vanes that make up the basic pattern may vary between 3 and 30 cm, and preferably between 5 and 15 cm.

The distance b separating two successive layers may vary between 3 and 50 cm, and preferably between 6 and 20 cm.

The vanes make with the horizontal an angle α which needs to lie between 45° and 75°, and preferably between 55° and 65°.

On the whole, in projection in the plane in which the patterns are distributed, which plane is referred to as a layer, the shape of the pattern projected into the layer is that of a star having 3 symmetrical branches, namely branches which between them form an angle of 120°, as depicted in FIG. 4b.

The packing according to the invention is obtained by repeating the elementary pattern described previously, in a plane at a triangular pitch spacing as depicted in FIG. 4b.

It should be clearly understood that the plane in which the elementary pattern develops, or layer, is itself different from the 3 planes that make it possible to define said elementary pattern, namely from the 3 planes defining the 3 vanes.

The elementary pattern repeats in a plane in a structure that has a triangular pitch spacing.

The pitch spacing is chosen so that there is no overlap between the vanes.

The pitch spacing is at minimum equal to:

$$d=(a+a^*\cos(60°)+b/2\sin(90°-\alpha))$$

but this pitch spacing may vary between 1 and 1.5 times the minimum distance d.

The angle α is the angle that the vanes of the elementary pattern make with the horizontal, and which is comprised between 45° and 75°, and preferably between 55° and 65°.

The distance a is the width of the vanes and comprised between 3 cm and 30 cm, and preferably between 5 cm and 15 cm.

The distance b is the distance separating two successive layers and comprised between 3 cm and 50 cm, and preferably between 6 cm and 20 cm.

The positions of the elementary patterns in two successive layers are depicted schematically in FIG. 4b in a configuration in which an offset of the triangle that joins 3 adjacent patterns in one layer is found again in the next layer.

Instances in which there is no offset from one layer to the next layer or in which the offset from one layer to the next layer is random still fall within the scope of the invention.

FIG. 4c depicts a sample of the complete structure developing in several vertically staged layers.

In FIG. 4c there are 6 successive layers depicted, but a greater number of layers is possible.

The triangular pitch spacing of the elementary patterns in each of the layers is the same, but the rotational orientation of the elementary patterns may change from one plane to another.

The preferred alternative form of embodiment of the present invention, referred to as "structured" is to have, on the one hand, the rotational orientation of the patterns offset by 180° from one layer to the next layer and, on the other hand, the triangles offset from one another as explained above.

Any combination of rotational offsetting of the patterns and of offsetting of the triangles, as explained above, still falls within the scope of the present invention.

One example of a structured orientation is for the rotational orientation of the patterns to be offset from one layer to the next layer by an angle comprised between 10° and 180°, preferably between 120° and 180° degrees, and more preferably still, between 150° and 180°.

The resultant effect of this three-dimensional structure is that of improving the mixing between the upflow gas phase and the upflow emulsion phase because, when considering the flow of each of the phases in a small volume, there is no longer any favored direction in which each of the phases would flow. The structure can therefore be referred to as anisotropic.

Overall, the flow of the gas is always an upflow and that of the emulsion a downflow, but bearing in mind the turbulence generated by the three-dimensional structured packing according to the invention, the mixing of said phases occurs without any favored direction. This improvement in the mixing is illustrated in the attached example, which relies on 3-D simulations.

The present packing exhibits a certain degree of complexity of production because it consists of a structured assembly of relatively complex elements.

Production of the structure according to the invention can be handled using the new construction methods that call upon additive manufacturing techniques, for example Selective Laser Melting (SLM), or Selective Laser Sintering (SLS) or else Fused Deposition Modeling (FDM).

The improvement to the mixing or contact between the gas and emulsion phases is evaluated by 3-D simulation using the fluid flow software that goes by the trade name Ansys Fluent.

More specifically, the effectiveness of the mixing is correlated with a coefficient, referred to as the coefficient of variation, the definition of which is given below:

$$\text{Cov} = \sqrt{\frac{1}{A}\sum_{i=1}^{N} A_i \left(\frac{T_i - T_o}{T_o}\right)^2}$$

This formula relates to a surface area A, this surface area being divided into a number N of cells of elementary surface area Ai. In general, the surface area A considered corresponds to that of a plane P passing through the calculation domain. It may, for example, correspond to a section of packing.

The entirety of the packing can therefore be swept by a series of planes P staged in the heightwise direction, each plane or layer being denoted P(hi) to indicate that it relates to the elevation dimension h(i).

A denotes the total surface area of the section considered,
Ai denotes the surface area corresponding to the cell i,
N the total number of cells of surface-area Ai contained in the surface area A,
Ti the local temperature of the cell i considered,
T0 the mean temperature over the surface A.

In general, the lower the coefficient Cov, the better the mixing between the gas and solid phases in the plane considered.

In order to improve the qualification of the mixing, a relative coefficient is introduced which takes account of the variation in the coefficient of mixing Cov between the fluid phase entering and this phase leaving.

Within the stripper, the solid placed in suspension by the upflow gas behaves like a liquid. The stripping phase therefore takes place under fluidized-bed conditions.

In order to illustrate the ability of the packing to improve the mixing, the emulsion phase has been represented by a downward-flowing liquid phase, by working on the similarity in density.

The greater the relative variation in the coefficient of mixing between the inlet and the outlet of the packing zone, the better the quality of the mixing across the packing as a whole is considered to be.

$$\mathrm{Cov\_relative} = \frac{Cov_{inlet} - Cov_j}{Cov_{inlet}}$$

EXAMPLES ACCORDING TO THE INVENTION

In the comparative example hereinbelow, a packing of the prior art corresponding to document U.S. Pat. No. 6,224,833 (FIG. 4b) is compared with a packing according to the invention in which each elementary pattern is inscribed inside a triangular-pitch mesh, the pitch spacing being from 1 to 1.5 times the minimum distance defined by "a+a*cos (60°)+b/2 sin(90°−α)", and the orientation of the elementary patterns from one layer to the next layer being offset by 180° C.

For the reference packing, the inclination alpha of the strips with respect to the horizontal 60°, and the spacing between the strips belonging to the one same plane is 8 cm. The width of the strips is 6.7 cm.

For the packing according to the invention, the angle alpha is 60° in the example.

The triangular pitch spacing is (a+a*cos(60°)+b/2 sin (90°−α)) where a=6.7 cm and b=8 cm.

The width of the strips is 6.7 cm.

The simulation is performed at temperature: a liquid with a poorly distributed temperature profile flows downward with a mass flow rate of the same order of magnitude as the solid stream flow rate in a stripper (typically 100 kg/m².s).

The poor distribution consists in creating a situation whereby half the inlet cross section is irrigated with hot fluid and the other half is irrigated with a cold fluid flowing co-currently.

It may be noted that there is a certain lateral spread in the temperatures in FIG. 5c, indicating that contact between the hot and cold streams occurs no longer merely in the direction of the strips but also in a substantially perpendicular direction, something which is an essential factor in the increase in the coefficient of mixing.

The packing according to the invention does therefore indeed achieve three-dimensional contact.

In order to illustrate the ability of this packing to disperse the stream in different directions, a 2$^{nd}$ simulation is performed by rotating the poor distribution at the inlet through 90° (the poor distribution is parallel to the planes of the packing of the prior art). This is depicted in FIG. 6.

The temperature profiles in this new configuration prove the absence of favored direction in the new packing (see FIG. 6c).

The relative Cov results corresponding to this case are also given in table 1 below.

Table 1 confirms, by means of the relative coefficient of mixing, that there is indeed an improvement in the mixing of the phases between the liquid inlet plane and a plane situated 40 cm inside the packing zone.

TABLE 1 comparison of Cov-relative between the inlet of the packing and 40 cm above

| Packing | Packing of the prior art | Packing according to the invention |
|---|---|---|
| Cov-relative (%): 1st scenario | 23 | 32 |
| Cov-relative (%): 2nd scenario | 4 | 41 |

The invention claimed is:

1. A three-dimensional structured packing for homogeneous contact between a gas phase and an emulsion phase flowing in counter-current, said packing comprising:
    a plurality of three-dimensional structures, each three-dimensional structure having an elementary pattern produced by 3 secant planes, said elementary pattern being a complex volume comprising 3 vanes, each vane respectively belonging to one of the 3 secant planes and the 3 secant planes, when considered in pairs of the planes, always have an intersection, and
    wherein the plurality of elementary patterns are distributed in a plurality of parallel distribution planes with each distribution plane being distinct from the 3 secant planes of the three-dimensional structures therein with a triangular pitch spacing, these distribution planes each being referred to as a distribution layer and the plurality of parallel distribution planes being referred to as a plurality of parallel distribution layers, and
    wherein the plurality of parallel distribution layers are stacked in the form of a vertical stack, each distribution layer having the same density of elementary patterns, and
    wherein in said packing said elementary patterns are inscribed inside a triangular-pitch mesh, the pitch spacing being from 1 to 1.5 times the minimum distance (d) defined by d=(a+a*cos(60°)+b/2 sin(90°− α)),
wherein
    angle (α) is the angle that the vanes of the pattern make with the horizontal, and which is between 45° and 75°,
    (a) is the width of the vanes and is between 3 cm and 30 cm, and
    (b) is the distance separating two successive distribution layers and is between 3 cm and 50 cm, and
    successive distribution layers being such that, from one layer to the next, the triangle formed by the 3 most closely-spaced elementary patterns belonging to the layer (N) is offset in layer (N+1) so that the vertex of a triangle of the layer (N+1) lies at center of a circle inscribed inside the triangle of the layer (N).

2. The three-dimensional structured packing as claimed in claim 1, in which the triangular pitch spacing at which the elementary patterns in a given layer are distributed is between 1.1 and 1.3 times the minimum distance (d).

3. The three-dimensional structured packing as claimed in claim 1, in which the rotational orientation of the elementary patterns changes by an angle of 180° from one layer to the next layer.

4. The three-dimensional structured packing as claimed in claim 1, in which the rotational orientation of the elementary patterns changes randomly from one layer to the next.

5. The three-dimensional structured packing as claimed in claim 1, in which both the rotational orientation of the elementary patterns and the offset of the triangles formed by 3 adjacent patterns change from one layer to the next.

6. The three-dimensional structured packing according to claim 1, wherein angle ($\alpha$) is between 55° and 65°.

7. The three-dimensional structured packing according to claim 1, wherein (a) is between 5 cm and 15 cm.

8. The three-dimensional structured packing according to claim 1, wherein (b) is between 6 cm and 20 cm.

9. The three-dimensional structured packing according to claim 1, wherein angle (a) is between 55° and 65°, (a) is between 5 cm and 15 cm, and (b) is between 6 cm and 20 cm.

10. The three-dimensional structured packing as claimed in claim 1, in which the rotational orientation of the elementary patterns changes by an angle between 10° and 180° from one layer to the next layer.

11. The three-dimensional structured packing as claimed in claim 1, in which the rotational orientation of the elementary patterns changes by an angle between 120° and 180° from one layer to the next layer.

12. The three-dimensional structured packing as claimed in claim 1, in which the rotational orientation of the elementary patterns changes by an angle between 150° and 180° from one layer to the next layer.

13. The three-dimensional structured packing according to claim 1, wherein the elementary patterns repeat in each distribution layer with the triangular pitch spacing being such that there is no overlap between the vanes of adjacent elementary patterns in each distribution layer.

14. The three-dimensional structured packing according to claim 1, wherein each of said vanes is rectangular.

15. A method for catalytic cracking comprising:
conducting said catalytic cracking using the packing as claimed in claim 1 as a means for improving contact between an upflow gas phase and a downflow emulsion phase,
said packing being placed inside a stripper of a catalytic cracking unit, said stripper operating as a fluidized bed with a fluidization rate of between 10 cm/s and 40 cm/s.

16. A method for catalytic cracking comprising:
conducting said catalytic cracking using the packing as claimed in claim 1, said packing being placed inside a stripper of a catalytic cracking unit, and said stripper operating with a solid stream flow rate of between 25 and 200 kg/m$^2$·s.

17. The method according to claim 16, wherein said stripper operates with a solid stream flow rate of between 50 and 150 kg/m$^2$ ·s.

18. A method for catalytic cracking comprising:
conducting said catalytic cracking using the packing as claimed in claim 1, said method being a deep catalytic cracking (DCC) method for catalytic cracking of hydrocarbon fractions.

19. A method of manufacturing the packing as claimed in claim 1, comprising manufacturing said packing by additive manufacturing.

20. A three-dimensional structured packing for homogeneous contact between a gas phase and an emulsion phase flowing in counter-current, said packing comprising:
a plurality of three-dimensional structures, each three-dimensional structure having an elementary pattern produced by 3 non-parallel planes, said elementary pattern being a complex volume comprising 3 vanes, each vane respectively belonging to one of said 3 non-parallel planes, and the 3 non-parallel planes, when considered in pairs of the planes, always have an intersection, and
wherein the plurality of elementary patterns are distributed in a plurality of parallel distribution planes with each distribution plane being distinct from the 3 non-parallel planes of the three-dimensional structures therein with a triangular pitch spacing, these distribution planes each being referred to as a distribution layer and the plurality of parallel distribution planes being referred to as a plurality of parallel distribution layers, and
wherein the plurality of parallel distribution layers are stacked in the form of a vertical stack, each distribution layer having the same density of elementary patterns, and
wherein in said packing said elementary patterns are inscribed inside a triangular-pitch mesh, the pitch spacing being from 1 to 1.5 times the minimum distance (d) defined by d=(a+a*cos(60°+b/2 sin(90°- $\alpha$)),
wherein
angle ($\alpha$) is the angle that the vanes of the pattern make with the horizontal, and which is between 45° and 75°,
(a) is the width of the vanes and is between 3 cm and 30 cm, and
(b) is the distance separating two successive distribution layers and is between 3 cm and 50 cm, and
successive distribution layers being such that, from one layer to the next, the triangle formed by the 3 most closely-spaced elementary patterns belonging to the layer (N) is offset in layer (N+1) so that the vertex of a triangle of the layer (N+1) lies at the center of a circle inscribed inside the triangle of the layer (N).

* * * * *